F. R. NYBERG.
WHEEL FOR TRACTION ENGINES.
APPLICATION FILED AUG. 9, 1915.
1,167,205.
Patented Jan. 4, 1916.
2 SHEETS—SHEET 1.
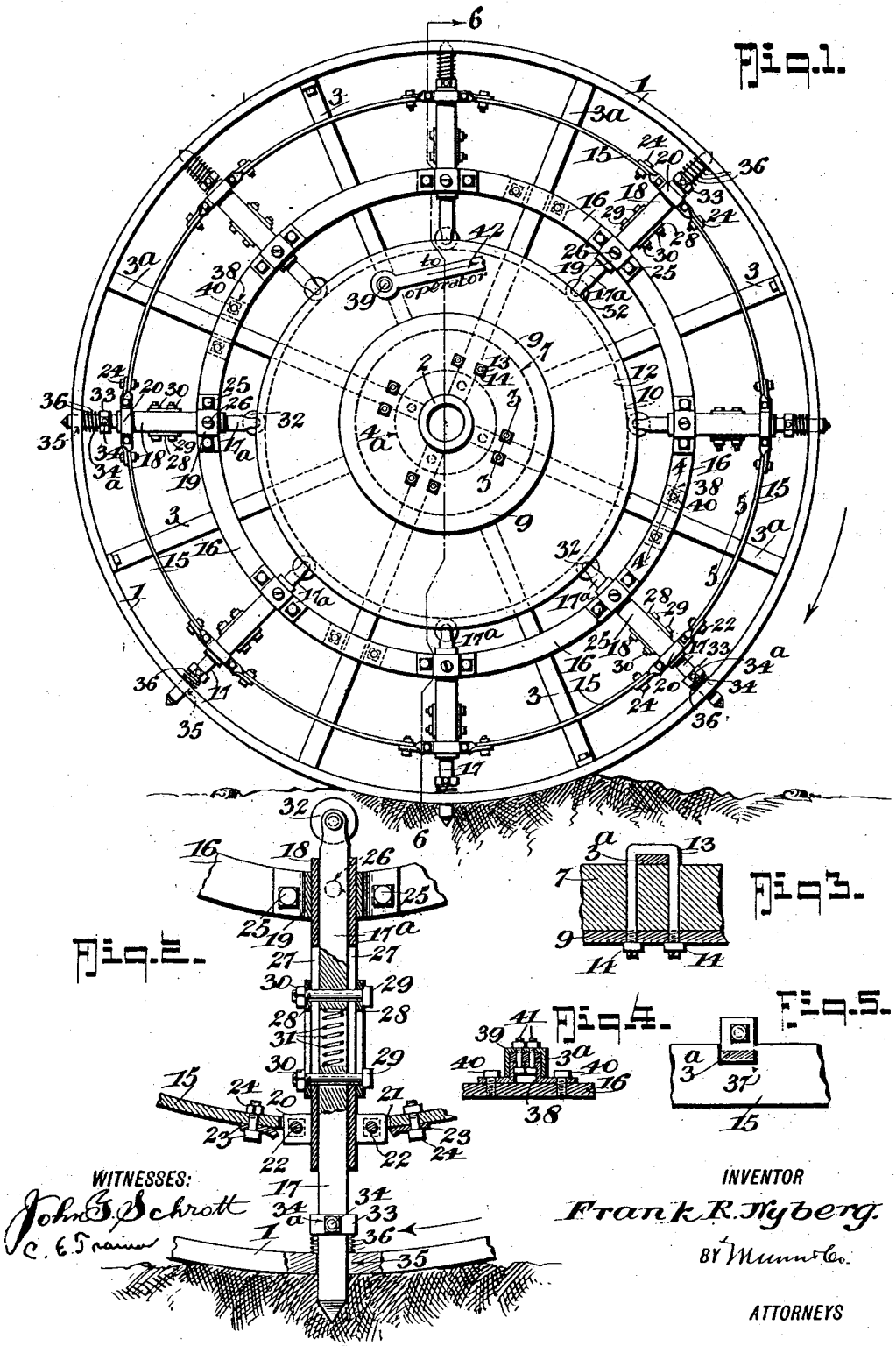
INVENTOR
Frank R. Nyberg.
BY Munn & Co.
ATTORNEYS

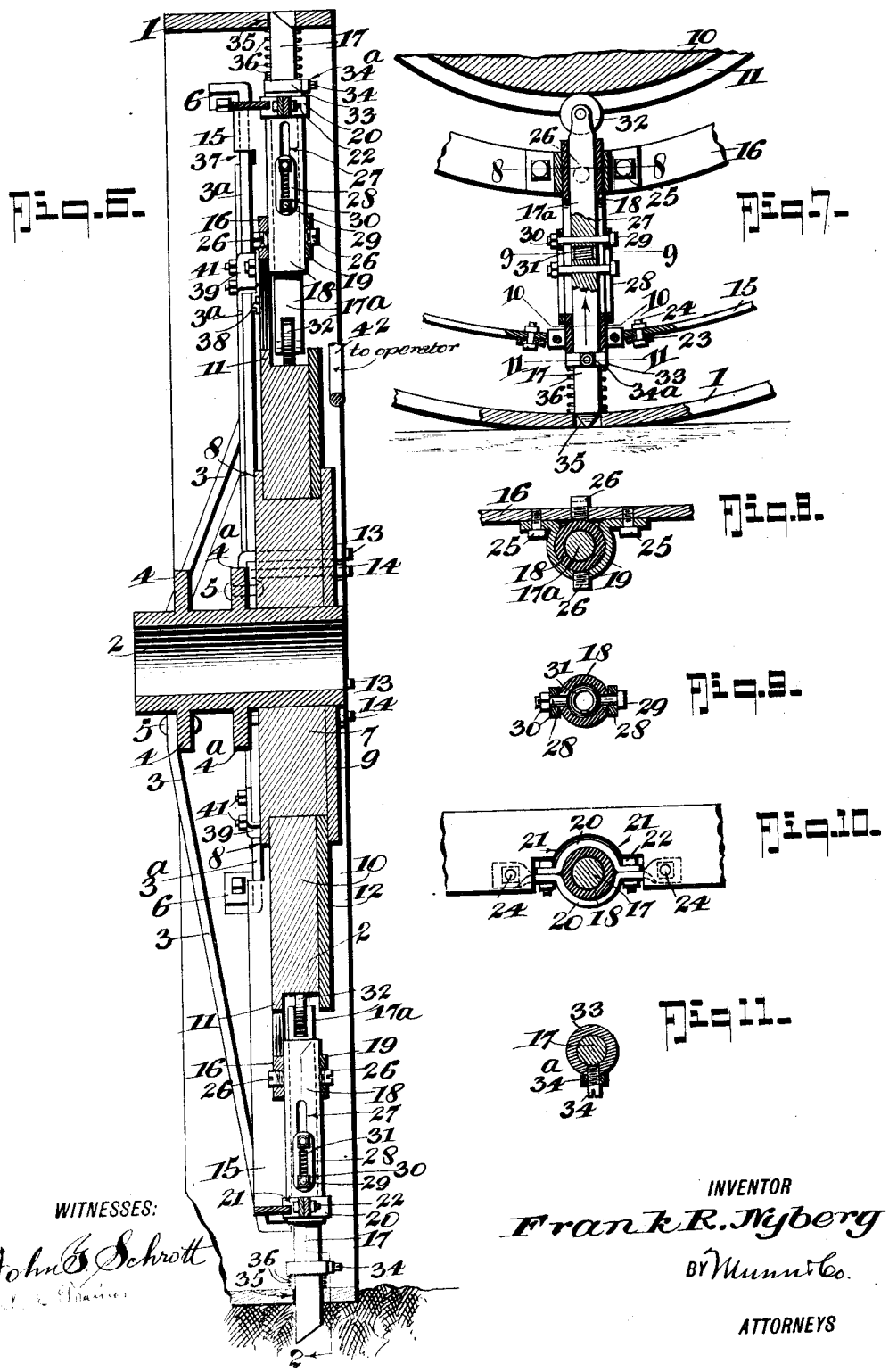

UNITED STATES PATENT OFFICE.

FRANK RUDOLPH NYBERG, OF LAMAR, COLORADO, ASSIGNOR OF ONE-HALF TO GEORGE J. GARVIN, OF LAMAR, COLORADO.

WHEEL FOR TRACTION-ENGINES.

1,167,205.      Specification of Letters Patent.      Patented Jan. 4, 1916.

Application filed August 9, 1915. Serial No. 44,556.

*To all whom it may concern:*

Be it known that I, FRANK R. NYBERG, a citizen of the United States, and a resident of Lamar, in the county of Prowers and State of Colorado, have invented certain new and useful Improvements in Wheels for Traction-Engines, of which the following is a specification.

My invention is an improvement in wheels for traction engines, and the invention has for its object to provide mechanism in connection with the usual drive wheel, for permitting the mud cleats usually used on the periphery of the wheel to be dispensed with, and wherein the said mechanism is so arranged that it may be brought into and out of operative position whenever desired, and wherein a series of holding dogs is provided, movable radially of the wheel, and operated by a cam, to cause them to protrude at any desired point in the periphery of the wheel, and wherein other mechanism is provided in connection with the dogs for preventing injury to the machinery of the engine or to the wheels or dogs from solid bodies in the road, as for instance, rocks, stumps and the like.

In the drawings: Figure 1 is a side view of a wheel provided with the attachment; Fig. 2 is a section on the line 2—2 of Fig. 6; Figs. 3, 4, 5 and 6 are sections on the lines 3—3, 4—4, 5—5 and 6—6 of Fig. 1, respectively, Fig. 6 looking in the direction of the arrow adjacent to the line; Fig. 7 is a partial section in the plane of the wheel, and Figs. 8, 9, 10 and 11 are sections on the lines 8—8, 9—9, 10—10 and 11—11, respectively, of Fig. 7.

The present embodiment of the invention is shown in connection with a wheel having a rim 1, a hub 2, and spokes 3 and 3ª, connecting the hub and the rim. Two series of spokes are provided, the series 3 being inclined, while the series 3ª are perpendicular to both rim and wheel. The hub 2 is provided with annular ribs 4 and 4ª, and the spokes of the series 3 and 3ª are connected at their inner ends to the ribs 4 and 4ª, respectively, by rivets 5 or the like, and their outer ends are provided with lateral lugs 6, which abut against the inner surface of the rim 1, and are secured thereto in any suitable manner.

It will be noticed from an inspection of Fig. 6, that the rib 4 is at one edge of the rim 1 of the wheel, while the rib 4ª is at approximately the center of the width of the rim, so that a portion of the interior of the wheel between the rim 1 and the hub 2 is left free and unobstructed for the insertion of the attachment. The attachment comprises a ring 7, having a central opening fitting the hub 2, at the outer side of the rib 4ª, and the ring is provided at its inner face with a marginal flange 8. A disk 9 is fitted on the hub outside of the ring 7, and this disk extends beyond the periphery of the ring 7 to a point flush with the periphery of the flange 8. The ring 7 fits against the outer faces of the spokes, and an eccentric 10 is journaled on the ring between the flange 8 and the disk 9. The eccentric 10 is mounted to rotate on the ring, or to move angularly with respect thereto, and the said eccentric is provided with a marginal flange 11 at its inner face and an eccentric ring 12 is fitted onto the periphery of the ring 7 at the outer face of the eccentric 10, and the disk 9 before mentioned fits outside of the ring 12, to hold the ring in place. The ring 12 is similar to the disk 10 and of the same diameter as the diameter of the eccentric 10 at the flange 11.

The disk 9 is clamped to the spokes 3ª, by means of clips 13, of U-shape, the arms of the clip passing through the ring 7 and the disk 9, with the body of the clip transversely of the spoke 3ª, and the arms are engaged by nuts 14 to clamp the parts in place. A ring 15 is arranged concentric to the wheel, near the rim 1, and a ring 16 is arranged between the ring 15 and the eccentric. The ring 15 has its wide dimension transverse to the plane of the wheel, while the wide dimension of the ring 16 is parallel with the wheel. These rings 15 and 16 support dogs for gripping the roadway. Each of the dogs is sectional, consisting of an outer section 17 and an inner section 17ª, and the sections are connected together in a manner to be described. Each dog 17—17ª is mounted to slide in a substantially cylindrical casing 18, which is supported by the rings 15 and 16. The inner end of each casing is supported by the ring 16, while the outer end of each casing is supported by the ring 15.

Substantially U-shaped clips 19 are provided for connecting the casing to the ring 16, and a pair of clips 20 is provided for connecting the outer end to the ring 15. The ring 15 is provided at each casing 18 with a notch or recess in the edge adjacent to the casing, and the holding clips 21 are bolted together by bolts 22 at opposite sides of the casing, and one of the sections is extended at its ends as shown at 23, and these extended ends are bolted to the ring 15 by bolts and nuts 24. The clips 19 are secured to the ring 16 by screws 25, and set screws 26 are passed through the ring 16 and the bodies of the clips 19 into engagement with the casing, to prevent longitudinal movement of the casing with respect to the ring and the clips.

The casing 18 is longitudinally slotted at opposite sides thereof, as indicated at 27, and longitudinally slotted connecting plates 28 are arranged outside of the casing 18 at the slots 27. Bolts 29 are passed through the ends of the plates 28 and through the dog sections, to connect the plates to the dog sections, and each bolt is engaged by a nut 30. The inner bolt which connects the section 17ᵃ to the plates 28 is passed through openings in the said plates, while the bolt 29 which connects the outer dog section 17 to the plate 28 is passed through the slots of the plates. These bolts 29 pass through the slots 27 of the casing, and it will be evident that the section 17 may move toward and from the section 17ᵃ, the bolt 29 moving in the slots of the plates 28. A coil spring 31 is arranged between adjacent ends of the sections, to normally hold them in extended condition, and this spring must be compressed before the sections can move together.

The inner end of the section 17ᵃ of each dog extends beyond the inner end of the adjacent casing 18, and each of the said sections is provided with a roller 32, which is journaled between the arms of a fork at the inner end of the section. The rollers 32 of the dogs engage the periphery of the eccentric 10, and the outer end of each dog section 17 is beveled as shown, to permit the entrance of the section into the ground, to prevent slipping of the wheel. A stop 33 in the form of a collar is arranged on each section 17, near the outer end of the casing 18, and each of said stops is held in place on the section by a set screw 34. Each set screw has a lock nut 34ᵃ for preventing disengagement of the same, and the outer end of each dog section 17 is engaged with a radial opening 35 in the rim 1. A coil spring 36 is arranged between each stop 33 and the inner face of the rim, the said spring acting normally to press the dog inward. The stops 33 limit the outward movement of the dogs, and also serve as a point of support for the inner end of the spring 36. The ring 15 before mentioned, is notched as shown at 37 at each spoke 3ᵃ, to permit the passage of the spoke, and each spoke 3ᵃ is connected to the ring 16, by means of a spacing clip 38, and a U-shaped cap 39. The spacing clip is secured to the ring 16 at its ends by means of screws 40, and the central portion of the clip is offset outwardly away from the ring into contact with the adjacent face of the spoke. The cap 39 fits over the spoke and this offset body portion, and bolts 41 are passed through the offset portion of the clip, the spoke and the cap, and are engaged by nuts outside of the cap.

In operation, the sectional dogs are of a length to extend from the lowest portion of the eccentric 10 to the outer surface of the rim 1, and it will be evident that when these dogs engage a higher portion of the eccentric, their outer ends will be extended beyond the periphery of the rim. The cam is moved angularly by the operator, by means of a link 42, which is pivoted at one end to the eccentric as shown in Fig. 1, and by means of the link the operator may move the eccentric on the ring 7. When the operator desires to utilize the dogs, he will move the eccentric into the position of Fig. 1, with the highest part of the cam almost directly below the hub. This eccentric is fixed relative to the wheel, by means of the link 42, which is connected with suitable holding mechanism at the opposite end from the eccentric. As the wheel rotates, the rollers 32 on the dogs will move in contact with the periphery of the eccentric, and as each dog begins to move downward at the front of the wheel, the dog will begin to extend beyond the periphery of the wheel. As each dog moves into engagement with the ground it will be extended beyond the periphery of the wheel, and will dig into the surface of the ground, thus insuring a grip of the wheel that will not slip. When it is no longer desired to use the dogs, the eccentric is moved with its highest point upward or above the hub. The dogs are now extended at the top of the wheel, and since they are always moving when the wheel is moving, there is no chance of a dog becoming jammed or stuck in its casing, so that it will not move when the operator wishes the same to move. The dogs will thus be kept free from mud and in the best possible condition for use. Should a dog when extended strike a rock or other obstruction, the spring 31 will yield, permitting the dog section 17 to move inward. The spring 31 is of sufficient strength to hold the dog section in extended condition under ordinary conditions.

I claim:

1. The combination with a wheel, of a series of tubular casings supported by the wheel radially thereof, a dog mounted in each casing to move longitudinally thereof, each dog consisting of inner and outer sections, and the sections extending beyond the casing at each end thereof, a spring between the sections and normally holding them spaced apart from each other, a slidable connection between adjacent ends of the dog sections to permit them to move toward and from each other and longitudinally of the casing, means adjustable angularly of the wheel for engaging the inner ends of the dogs to extend the dogs beyond the periphery of the wheel, and springs forcing the dogs inwardly.

2. The combination with a wheel, of a series of tubular casings arranged radially of the wheel in spaced relation, a sectional dog arranged in each casing and movable longitudinally thereof, each dog consisting of an inner and an outer section, a slidable connection between the sections of each dog and slidably connected with the casing, a spring arranged between the sections of each dog and adapted to be compressed when the outer end of the dog meets with an obstruction and normally holding them extended, an eccentric journaled on the hub, the inner ends of the dogs engaging the periphery of the eccentric, and said eccentric extending the dogs beyond the periphery of the casing when the highest portion thereof is in engagement with the said inner ends, a common means for moving the eccentric angularly to cause the dogs to be extended at any point in the periphery of the wheel, and for holding the eccentric from movement with the wheel, and springs forcing the dogs inwardly.

3. The combination with a wheel, of a series of tubular casings supported by the wheel radially thereof, a dog mounted in each casing to move longitudinally thereof, an eccentric journaled coaxial with the wheel and engaging the dogs at their inner ends, the rim having an opening for each dog for permitting the dog to pass at its outer end beyond the rim, a stop adjustably mounted on each dog and near the inner side of the rim and a spring between each stop and the rim and normally pressing the dog inward.

4. The combination with a wheel of a series of tubular casings supported by the wheel radially thereof, a pair of coaxial inner and outer rings between the rim and the hub, a clip connecting the inner end of each casing to the inner ring, a sectional clip connecting the outer end of each casing to the outer ring, an eccentric journaled on the hub, a dog in each casing engaging the eccentric at its inner end, springs pressing the dogs inwardly, and means for holding the eccentric from movement and for adjusting the same angularly with respect to the wheel.

FRANK RUDOLPH NYBERG.

Witnessed by—
GROVER L. CARRICO,
CLARENCE P. CHILDRESS.

Copies of this patent may be obtained for five cents each, by addressing the "Commissioner of Patents, Washington, D. C."